Feb. 2, 1965 HANS-GEORG LINDENBERG ETAL 3,167,808
HANDLE SUPPORT FOR A STORAGE BATTERY CONTAINER
Filed Nov. 21, 1961
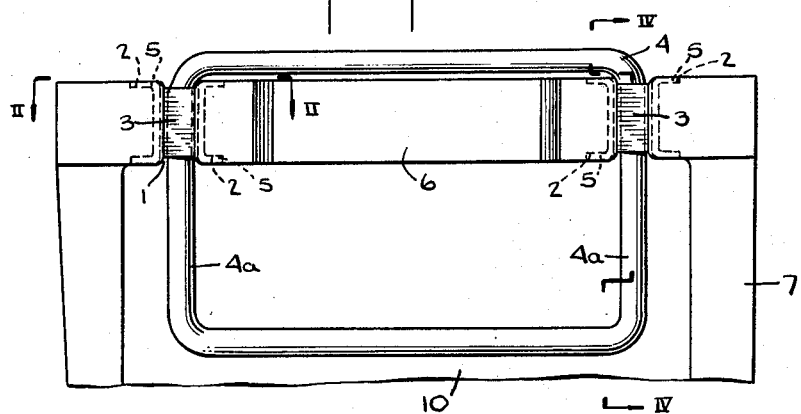
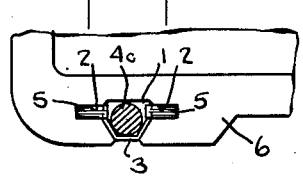
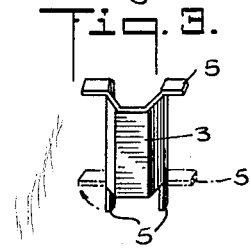
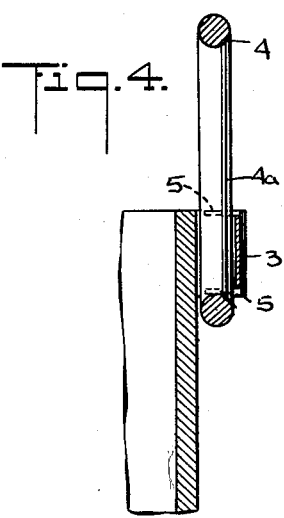
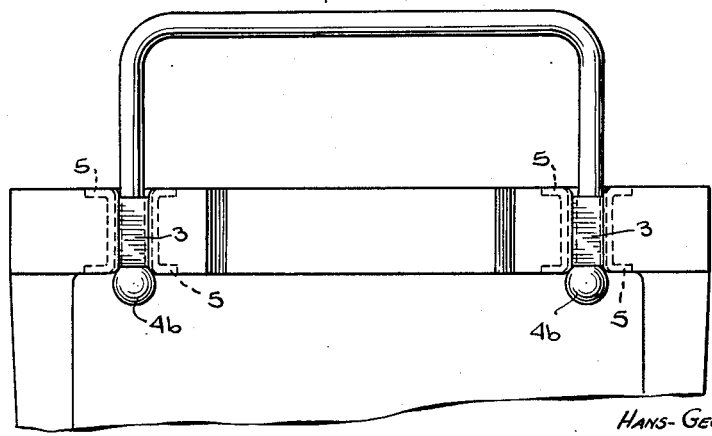
INVENTORS
HANS-GEORG LINDENBERG
ROLF SEYBERLICH
BY
AGENT United States Patent Office 3,167,808
Patented Feb. 2, 1965

3,167,808
HANDLE SUPPORT FOR A STORAGE BATTERY CONTAINER
Hans-Georg Lindenberg and Rolf Seyberlich, both of Hannover, Germany, assignors to Varta Aktiengesellschaft, Frankfurt am Main, Germany, a corporation of Germany
Filed Nov. 21, 1961, Ser. No. 153,916
Claims priority, application Germany, Nov. 25, 1960, A 36,126
5 Claims. (Cl. 16—125)

The present invention relates to an improved handle support for storage battery containers, such as vulcanized hard rubber containers.

Various means have been proposed to provide storage battery containers with means for supporting and carrying them to facilitate the transport of the relatively heavy batteries, for example, or the replacement of such batteries in cars or other locations. All these proposals have disadvantages either in the difficulties in the molding and vulcanizing of the containers, in the lack of resistance of the devices to breakage, in the production difficulties and expenses encountered, in the failure to resist corrosion, or in the rattling caused when the batteries are exposed to jerking movements.

It is the primary object of the present invention to overcome the various prior art disadvantages and to produce a handle support means which is cheap and simple to produce while being exceedingly dependable in operation.

It is another object of this invention to produce such a handle support means which may be readily mounted on any type of battery container without adding to molding or vulcanizing costs or work.

These and other objects are accomplished in accordance with the invention by clamping a handle in corresponding recesses in the conventional thickened upper rim portion of the container by means of two short profiled elements which constitute guide members for two handle legs. The pair of recesses extend substantially perpendicularly through the rim portion and have a transverse cross-section which narrows towards the surface of the rim portion, i.e. the cross-section may be dove-tailed or semi-circular. The guide members may readily be placed into the recesses and may be clamped in, for instance, by pairs of lugs extending from both ends of the guide members and being bendable into a plane extending perpendicularly to the guide members, the rim portion having grooves extending in this plane for receiving the bent lugs.

In this manner, the guide members are clamped securely in the recesses and cannot be removed therefrom either by horizontal or vertical tensile forces exerted thereupon. Lateral removal of the guide members is made impossible by the narrowing of the recesses toward the front of the rim and vertical removal is prevented by the clamping means bent perpendicularly to the vertical.

The above and other objects, advantages, and features of the present invention will be more fully explained in the following detailed description of certain preferred embodiments thereof, taken in conjunction with the accompanying drawing wherein FIG. 1 is a side view of the upper part of the narrow side of a storage battery container of rectangular transverse cross section, showing one embodiment of the handle support means of this invention;

FIG. 2 is a section along line II—II of FIG. 1;

FIG. 3 is a perspective view of one embodiment of a guide member according to the invention;

FIG. 4 is a section along line IV—IV of FIG. 1;

FIG. 5 is a view similar to that of FIG. 1 but showing a different handle, and

FIG. 6 is similar to FIG. 3 but shows a modified embodiment of the guide member.

Referring now to the drawing and first to the embodiment of FIGS. 1 to 4, the storage battery container 10, for instance, of vulcanized hard rubber, is shown to be provided with a thickened upper rim portion 6 as well as with thickened corner portions 7. According to the invention, recesses 1 and, where provided, grooves 2 may be molded into the upper rim portion at the time the container is molded and vulcanized so that mounting of the handle support means only requires placing the handle 4 into the recesses by means of guide members 3, as will be more fully explained hereinafter.

As shown, the pair of recesses 1 extend substantially perpendicularly through the upper rim portion 6 parallel to the corner portions 7 and have a transverse cross-section (see FIG. 2) which narrows towards the surface of the rim portion. In the embodiment of FIG. 2, the recess has a dove-tailed transverse cross-section widening towards the interior of the recess for accommodating the legs 4a, 4a of the handle. The transverse cross-section could also be semi-circular instead of being dove-tailed. This cross-sectional configuration of the recess serves to distribute tensile forces exerted by the handle over a larger area.

The compact recesses interfere neither with the molding nor the vulcanizing of the container and the dimensioning of conventional container rims is such that the guide members in these recesses would not break off.

The guide members for the handle legs have transverse cross-section generally conforming to the cross-section of the recesses wherein they are fitted. As appears clearly from FIGS. 3 and 6, guide members 3 may be simply and fully automatically stamped from any suitable material which may be formed cold and which should be chemically and mechanically resistant. Corrosion-resistant steel, such as V2A-steel, is a useful material for guide members 3.

The semi-annular (FIGURE 6) or dove-tailed (FIG. 3) main body of the guide member is provided with a clamping means illustrated as pairs of lugs 5 extending from both ends of the guide member and being bendable into a plane (see broken lines in FIGS. 3 and 6) extending perpendicularly to the guide members. To receive the bent lugs, the thickened rim portion 6 of the container has corresponding grooves extending in this plane.

Mounting of the handle in the container is exceedingly simple. The handle legs 4a, 4a are placed into recesses 1. The guide members 3 are placed around said handle legs 4a, 4a above—or below—said recesses 1 and are then inserted into the recesses, and the pairs of lugs 5 are bent over to engage grooves 2, thus securely clamping the guide members in the recesses and holding the handle legs therein. The outside openings of the recesses 1, of course, must permit passage of the handle legs 4a, 4a laterally therethrough.

The handle 4 may be of a rigid or flexible material and it may be an endless element, as shown in the embodiment of FIG. 1. FIG. 5, which is identical in all other respects with FIG. 1, shows an alternative embodiment of a handle wherein the legs have thickened ends 4b, 4b of a transverse cross section exceeding the cross section of the recesses so that the handle cannot slip out of the recesses.

Any suitable material may be used for the handle and even iron handles could be used although it would then be advantageous to protect them against corrosion by the electrolyte by coating them with lead or a corrosion-resistant plastic. It is preferred to use an elastic, corrosion-resistant synthetic resin of a low coefficient of elongation since such a material will make the most useful handle support for a storage battery. If the guide members 3 are also of a corrosion-resistant material, such as V2A-steel or special synthetic resins, the entire handle support means of the present invention will be resistant to corrosion by the electrolyte.

Contrary to conventional storage battery handle support means, the device of this invention is completely independent of any manufacturing tolerances to be considered during molding and vulcanizing of the container. The tensile forces exerted upon the handle support of the invention are very favorably distributed. If an endless handle is used, as illustrated in FIG. 1, any upwardly directed tensile force will be distributed over the entire length of the thickened rim portion 6 lying between the two recesses 1. Laterally directed forces will be distributed by the guide members 3 to the entire area of the adjacent rim portion, including the areas in contact with bent-over lugs 5.

While the invention has been described in connection with certain preferred embodiments thereof, it will be understood that many variations and modifications may occur to the skilled in the art without departing from the spirit and scope of the present invention as defined in the appended claims.

It may be mentioned that synthetic resins useful for making the handles and/or the guide members which have a relatively low coefficient of elongation may be composed of soft polyvinyl chloride, polyolefins such as polyethylene, polypropylene, polyamides, and others. These plastics are sufficiently elastic to fit the hand, are acid resistant, and are strong enough not to break or flow under the weight of the storage battery.

It is, furthermore, pointed out that the recesses 1 may be provided in the thickened rim portion 6 after the container has been molded and vulcanized, for instance, by recessing by means of a milling machine, by filing, and the like. Thus it is possible to provide old storage battery containers with the handle support means according to the present invention.

We claim:
1. Handle support means for a storage battery container having a thickened upper rim portion, comprising a handle having two legs, a guide member for each of said handle legs, the guide members being arranged in a pair of recesses in said rim portion, the recesses extending substantially perpendicularly through the rim portion and having a transverse cross-section which narrows towards the surface of the rim portion, and clamping means holding the guide members in said recesses against vertical displacement, the guide members holding the handle legs in said recesses and conforming to said recesses whereby the guide members are held against outward lateral displacement by the narrow section of the recesses at the surface of the rim portion.

2. The handle support means of claim 1, wherein said clamping means comprises pairs of lugs extending from both ends of the guide members and being bendable into a plane extending perpendicularly to the guide members, the rim portion having grooves extending in said plane for receiving the bent lugs.

3. The handle support means of claim 1, wherein said material is steel.

4. Handle support means for a storage battery container having a thickened upper rim portion, comprising a handle having two legs, a guide member for each of said handle legs, the guide members being arranged in a pair of recesses in said rim portion, the recesses extending substantially perpendicular through the rim portion and having a dove-tailed transverse cross-section widening toward the interior of the recesses for accommodating the handle legs, and clamping means holding the guide members in said recesses against vertical displacement, the guide members being correspondingly dove-tailed to fit into the recesses and to hold the legs in the recesses against outward lateral displacement.

5. Handle support means for a storage battery container having a thickened upper rim portion, comprising a handle having two legs, a guide member for each of said handle legs, the guide members being arranged in a pair of recesses in said rim portion, the recesses extending substantially perpendicularly through the rim portion and having a semi-circular transverse cross-section widening toward the interior of the recesses for accommodating the handle legs, and clamping means holding the guide members in said recesses against vertical displacement, the guide members being correspondingly semi-annular to fit into the recesses and to hold the legs in the recesses against outward lateral displacement.

References Cited by the Examiner
UNITED STATES PATENTS

| | | | |
|---|---|---|---|
| 1,472,508 | 10/23 | Beckman | 16—125 |
| 1,697,063 | 1/29 | Holland | 16—125 |
| 1,772,650 | 7/29 | Wagenhorst | 16—125 |

DONLEY J. STOCKING, *Primary Examiner.*
JOHN R. SPECK, *Examiner.*